United States Patent
Du et al.

(10) Patent No.: US 9,394,488 B2
(45) Date of Patent: Jul. 19, 2016

(54) METHOD FOR OPTIMIZING CATALYST/OIL MIXING IN AN FCC REACTOR FEED ZONE

(71) Applicant: ExxonMobil Research and Engineering Company, Annandale, NJ (US)

(72) Inventors: Bing Du, Fairfax, VA (US); Alvin U. Chen, Reston, VA (US); Christopher G. Smalley, Manassas, VA (US); Kentaro Kobayashi, Tokyo-to (JP); Masaaki Sugita, McLean, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 329 days.

(21) Appl. No.: 13/860,798

(22) Filed: Apr. 11, 2013

(65) Prior Publication Data

US 2014/0305841 A1    Oct. 16, 2014

Related U.S. Application Data

(60) Provisional application No. 61/635,495, filed on Apr. 19, 2012.

(51) Int. Cl.
| | | |
|---|---|---|
| *C10G 11/18* | (2006.01) | |
| *G05D 23/22* | (2006.01) | |
| *G05D 23/00* | (2006.01) | |
| *G05D 23/30* | (2006.01) | |

(52) U.S. Cl.
CPC .................................. *C10G 11/187* (2013.01)

(58) Field of Classification Search
CPC ...... C10G 11/187; C10G 11/18; G05D 23/00; G05D 23/1927; G05D 23/193; G05D 23/1932; G05D 23/1934
See application file for complete search history.

(56) References Cited

U.S. PATENT DOCUMENTS

| | | | |
|---|---|---|---|
| 4,092,722 A | | 5/1978 | Hofferber et al. |
| 4,808,383 A | | 2/1989 | Buyan et al. |
| 5,173,175 A | | 12/1992 | Steffens et al. |
| 5,188,805 A | | 2/1993 | Sabottke |
| 5,298,155 A | | 3/1994 | Sabottke |
| 5,322,618 A | | 6/1994 | Raterman |
| 5,324,418 A | | 6/1994 | Muldowney |
| 6,012,652 A | | 1/2000 | Holtan et al. |
| 6,156,189 A | | 12/2000 | Ho et al. |
| 6,859,759 B2 | | 2/2005 | Evans |
| 7,460,915 B2 | | 12/2008 | Marik et al. |
| 7,567,887 B2 | | 7/2009 | Emigholz et al. |
| 7,991,577 B2 | | 8/2011 | Havener et al. |
| 8,010,292 B2 | | 8/2011 | Kant et al. |
| 2007/0212790 A1 | | 9/2007 | Welch et al. |
| 2007/0251862 A1 | * | 11/2007 | Evans et al. ................... 208/106 |
| 2008/0116051 A1 | | 5/2008 | Miller et al. |
| 2008/0281557 A1 | | 11/2008 | Emigholz |
| 2009/0095657 A1 | | 4/2009 | Taha et al. |

OTHER PUBLICATIONS

The International Search Report and Written Opinion of PCT/US2013/036351 dated Oct. 21, 2013.

* cited by examiner

*Primary Examiner* — Renee E Robinson
*Assistant Examiner* — Derek Mueller
(74) *Attorney, Agent, or Firm* — Bruce M. Bordelon; Chad A. Guice

(57) ABSTRACT

A method of improving the uniformity of the contacting of a heavy oil feed with FCC cracking catalyst in the feed zone of an FCC cracking riser in which the heavy oil feed is injected into the catalyst in the riser by means of feed injectors located around the riser, the method comprising minimizing the differences in the temperature profile in the oil/catalyst mixture across the feed zone by varying the oil feed rate to the injectors.

15 Claims, 5 Drawing Sheets

METHOD FOR OPTIMIZING CATALYST/OIL MIXING IN AN FCC REACTOR FEED ZONE

CROSS-REFERENCE TO RELATED APPLICATIONS

This application claims priority to U.S. Provisional Application Ser. No. 61/635,495 filed Apr. 19, 2012, which is herein incorporated by reference in its entirety.

FIELD OF THE INVENTION

The invention is directed to a process for controlling product yields and distributions in a fluid catalytic cracker unit (FCCU). In particular, the invention is directed to a process for improving the contacting of the FCC feed with the cracking catalyst in the feed zone of the cracking riser to achieve yield and/or quality objectives.

BACKGROUND

In the petroleum refining industry, the fluidized catalytic cracking (FCC) of heavy oil feeds is well established and a number of different cracking processes and units are available to the industry. The process may be oriented to conversion of the feed to gasoline or to other desired products such as the light olefins used as petrochemical feedstocks. The parameters of the FCC process are well-known and the technical literature is replete with discussion of the process.

Normally, suitably preheated, relatively high molecular weight hydrocarbon feeds such as vacuum gas oil or gas oil and resid are contacted with hot, finely-divided, solid catalyst particles in a fluidized bed reaction zone which now is conventionally in the form of an elongated upright riser. The catalyst/oil mixture is maintained at an elevated temperature in a fluidized state for a period of time sufficient to effect the desired degree of cracking to the desired lower molecular weight hydrocarbons such as those typical of those present in motor gasolines and distillate fuels.

During the cracking reaction, coke is deposited on the catalyst particles, reducing the activity of and selectivity of the catalyst. In order to restore activity, the catalyst is transferred from the reaction zone into a regeneration zone where the spent catalyst is maintained as a fluidized bed by the upward passage of an oxygen-containing regeneration gas, such as air, under conditions to burn at least a portion, preferably a major portion, of the coke from the catalyst. The regenerated catalyst is subsequently withdrawn from the regeneration zone and reintroduced into the reaction zone for reaction with additional hydrocarbon feed. The regeneration serves not only to remove the accumulated coke from the catalyst to restore its activity but also to supply heat from the exothermic combustion process in the regenerator for the endothermic cracking in the reactor so as to maintain an overall operating heat balance for the unit.

In a fluid catalytic cracking unit (FCCU), the prevailing commercial practice is to employ feed injector nozzles which atomize the heavy oil feed and inject into the feed zone at the base of the riser. It is typical to dispose a number of injectors around the periphery of the riser, the exact number depending on the size of the riser and the unit, for example, four, six or eight. The injectors typically atomize the feed with the aid of steam. The injectors are typically disposed at one level in the riser. Much effort has been expended in the design of the injector nozzles with the objective of improving catalyst/oil mixing and a number of different proprietary nozzle designs exist, each with its own asserted advantages. This focus of effort, however, has only addressed one side of the problem, namely the injection of the oil; in order to address the mixing problem more completely, it is necessary to consider also the effect of the catalyst on the mechanism of the mixing.

In the FCC unit, the regenerated hot catalyst from the regenerator is transported downward from the regenerator in a standpipe and then through a bend (e.g., J-bend or U-bend) and lifted upward into the feed zone of the FCC riser by a current of steam at the base of the riser. The feed is generally radially injected into the feed zone of the FCC riser reactor, with nozzles arranged around the circumference of the riser. It is generally assumed that the solids distribution in the standpipe and feed zone is uniform and the feed nozzle design is also based on the assumption of uniform solids distribution in the feed zone. Observation has shown, however, that the feed zone may be far from uniform. Poor oil-catalyst contacting arising from the non-uniformity catalyst distribution and non-even distribution of the feed rate to each feed nozzle with radial feed injection may lead to excessively hot and cold regions in the riser feed. This results in poor yield selectivity, higher dry gas and butadiene make, and increased MCB (main column bottom) yield at constant coke yield. Non selective thermal cracking in the hot regions of high cat/oil ratio raises the amount of low value light gases. Incomplete feed vaporization in the cold regions with low cat/oil ratio increases MCB yield at constant coke yield.

Because the FCCU is probably the single most important generator of valuable fuels and chemical products in a refinery, even minor variations of yields can have a significant impact on economics. Constant optimization of the unit is therefore necessary and the FCCU is normally operated under multivariable constraint control to maximize refinery profits on a continuous basis with product yield and quality being important factors in overall profitability. Optimization of the feed zone has, up to the present been carried out on a trial-and-error basis using the experience of the unit operators and engineers in an attempt to secure the operating conditions needed for the best unit economics. This existing approach does not result in optimal feed/catalyst distribution in the feed/mixing zone and in view of the large throughput of these units, even relatively short-lived departures from the optimal conditions may result in significant losses in profitability. The problem facing the prudent refinery operator, therefore, is to systematize the operation of the feed/mixing zone to secure optimally uniform mixing.

SUMMARY OF PREFERRED EMBODIMENTS OF THE INVENTION

We have now developed a method of achieving an improved level of uniformity in the feed/mixing zone of an FCC unit favoring improved value product yields. The method which has been developed enables a more uniform catalyst-oil ratio to be attained in the riser and reduces the non-selective thermal cracking that produces low value light gases and low value heavy liquid products. In essence, the method rebalances the feed injectors in accordance with the catalyst flow pattern in the riser to achieve a more uniform temperature profile across the riser above the feed zone (or alternatively referred to as "feed/mixing zone"). In effect in this novel method, precise feed settings are determined and the feed injection pattern is adjusted to accommodate the catalyst flow pattern so that the two are matched, the one with the other. The assumption that the catalyst flow profile is uniform is discarded in favor of a dynamic assessment of the flow profile; this catalyst flow profile is determined indirectly from the temperature profile which is measured immediately downstream of the mixing zone. The uniformity of the contacting of the oil with the catalyst in the FCC feed zone is determined by minimizing the differences in the temperature profile in the oil/catalyst mixture across the feed/mixing zone.

According to the invention, the uniformity of the contacting of a heavy oil feed with FCC cracking catalyst in the feed zone of an FCC cracking riser in which the heavy oil feed is injected into the catalyst in the riser by means of feed injectors located around the riser, is improved by minimizing the differences in the temperature profile in the oil/catalyst mixture across the feed/mixing zone. These temperature differences, in turn, are minimized by varying the feed rates at one or more of the oil feed injectors.

The improved operation is achieved and implemented in the following steps:
1. The temperature of the feed/catalyst mixture in the feed/mixing zone of the FCC riser profile is measured in a feed nozzle step test in which the feed to each injector nozzle is varied while the temperature profile is determined.
2. A feed rate for each injector at which the temperature difference across the feed/mixing zone is minimized is determined, and
3. The heavy oil feed is injected into the teed/mixing zone through the injectors at a flow rate (including zero flow rate if necessary) at which the temperature difference across the feed/mixing zone is minimized.

The methodology utilized to rebalance the feed to the injectors is carried out as follows:
1. The temperature responses of the temperature indicators (TIs) in the feed zone are monitored in a feed nozzle step test in which the feed to each injector nozzle is varied while the temperature response of the feed zone TIs is determined.
2. A temperature response matrix model is developed from the data obtained in Step 1. The temperature response matrix model indicates the TI temperature change with one nozzle closed from the base case with all nozzles fully opened.
3. Third, the temperature response matrix model is used as a basis to develop a predictive model from an optimization algorithm to generate the temperature spread across the feed zone, $\Delta T=\max(TIs)-\min(TIs)$ as the feed rate to each feed injector is varied.
4. The feed rate to each feed injector is adjusted via, the appropriate optimized selection from Step Three to optimize the feed zone performance by adjusting according to the constraints in the refinery (e.g., feed header pressure, feed injector valve type).

If the calculations identify more than one optimum solution, the solution can be further optimized by imposing hierarchical constraints (such as maximum atomizer flow, minimum atomizer valve pressure, maximum riser temperature, etc.) on the setting selections. By applying this methodology, the feed zone temperature distribution can be optimized to improve the catalyst-oil contacting in the FCC riser, which in turn reduces the amount of non-selective thermal cracking that produces low value light gases. Compared to the present commercial practices using trial-and-error, the feed injector rebalancing methodology can reduce the significant effort required to perform unit optimizations as well as to maximize feed zone performance by selecting a global optimum settings for each of the feed nozzles given specific refinery operating constraints.

FIGURES

DETAILED DESCRIPTION

Currently, the FCC process is operated by injecting the heavy oil feed, into an elongated, vertical riser in which it is mixed with the hot, finely-divided, catalyst particles in the feed zone (or alternatively referred to as "feed/mixing zone"). The catalyst/oil mixture then passes up the riser at an elevated temperature in a fluidized state for a short time, typically less than 10 seconds, to effect the desired degree of cracking to lower molecular weight products. The cracking products and catalyst are then separated after which the cracking products pass to the recovery section including a main fraction column while the catalyst particles are stripped of occluded cracking products and then transferred to the regenerator in which the coke which accumulates on the particles during the cracking is burned off the catalyst. The hot, regenerated catalyst is recirculated to the foot of the riser to be mixed with fresh, incoming heavy oil feed in the FCC reactor feed/mixing zone.

The regenerated catalyst enters the feed/mixing zone of the riser from a standpipe by way of a U-bend or J-bend and is then lifted into the feed mixing zone by means of steam supplied at the riser base. The feed is injected through injector nozzles (alternatively as may be referred to herein as "feed nozzles" or "feed injectors" or simply "injectors") or arranged to inject the feed radially into the rising column of catalyst with the objective of achieving uniform mixing and contact between the oil and the catalyst in order to attain a predictable and controllable mix of cracked products. Two significant factors enter into the contacting: injector efficiency and catalyst flow distribution across the riser in the feed/mixing zone. If the catalyst distribution is not uniform across the riser or the feed rate to each feed nozzle evenly distributed or if the radial feed injection design leads to excessively hot and cold regions in the riser feed zone, poor oil-catalyst contacting will arise, typically indicated by indicated by temperature indicator (TI) readings in or immediately above the feed zone. This poor contacting results, in turn, in poor yield selectivity, higher dry gas and butadiene make, and increased main column bottoms (MCB) yield at constant coke yield. Non-selective thermal cracking in the hot regions of high cat/oil ratio raises the amount of low value tight gases. Incomplete feed vaporization in the cold regions with low cat/oil ratio increases MCB yield at constant coke yield.

Figure 1:
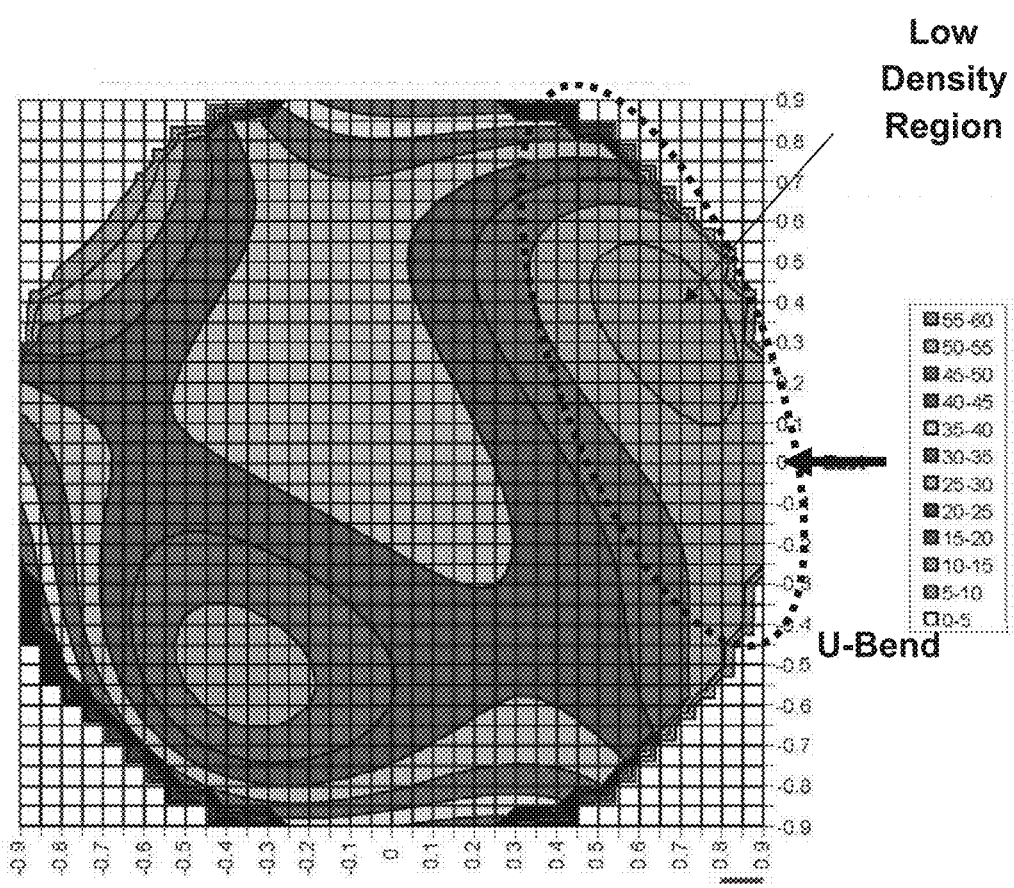
FIG. 1 is a diagram showing the feed zone solids density distribution of a commercial FCCU riser as determined by a gamma ray scan.

FIG. 1 shows the solids density distribution across the cross section of the FCC riser as determined by a gamma-ray scan of the feed zone in the riser of a large FCCU, measured 1.2 m (4 ft) below the level of the feed injection. While the B/W drawing does not give the full detail of the original in color, it can be seen that there is the catalyst from the regenerator standpipe does not enter the riser in a uniform manner. A large low density area is seen in the region close to the U-bend (right of diagram). While this might reasonably be attributed to the centrifugal forces arising from the passage around the U-bend, a region of low to medium density was noted just off-axis opposite the U-bend entry point (lower left in diagram) which could not be explained by any ready consideration of the expected flow patterns. Other inhomogeneities in the flow pattern can also be seen, indicating the unpredictable character of the catalyst flow profile before it enters the feed zone. Given that catalyst flow rates from the regenerator vary with time and also with perturbations in the unit, the persistence of any flow profile cannot be assured and for this reason, no optimization method based on any fixed assumption can be made. Also, given the pseudo-random nature of the inhomogeneities, operator experience cannot be expected to compensate for the largely unknown effect of variations in the operation of the unit. For these reasons, optimization of the catalyst/oil contacting has to be on a dynamic utilizing all relevant factors. According to the invention, this optimization is effected by a methodology in which the temperature profile across the FCC riser is used as a determinant of the mixing process and as a control upon the mixing process itself by feed-back to the feed injectors.

Figure 2:
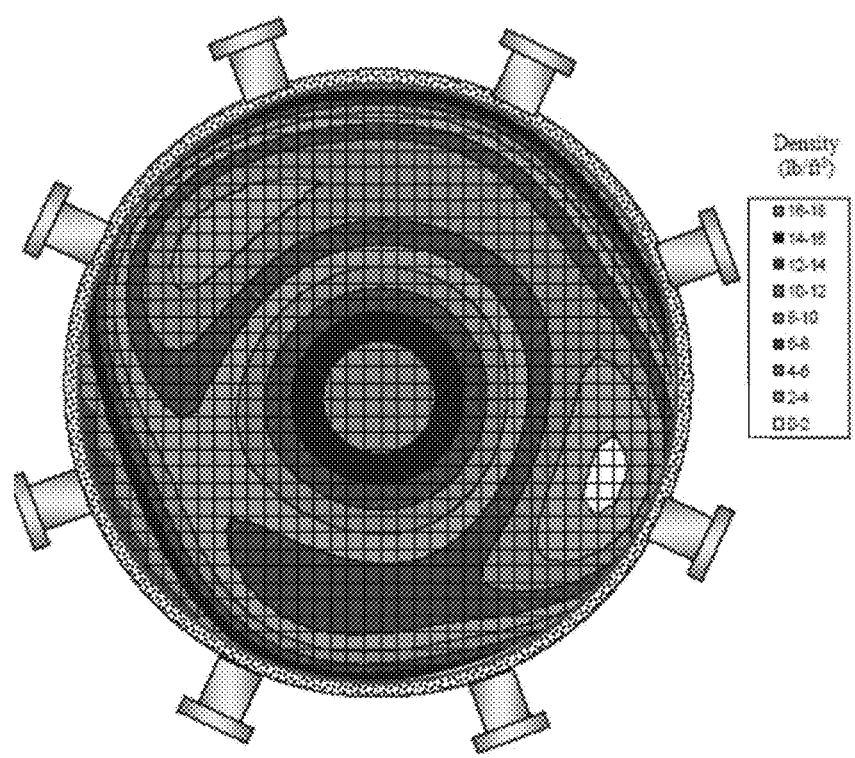
FIG. 2 is a diagram showing the feed zone solids density distribution of a second commercial FCCU riser as determined by a gamma ray scan.
Figure 3:
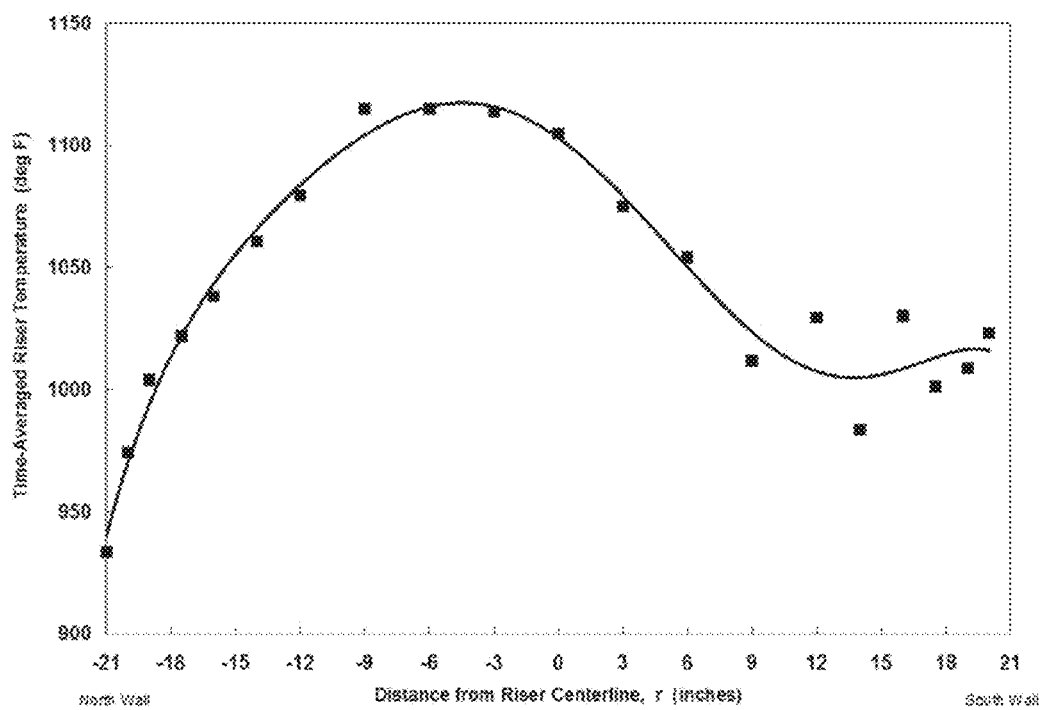
FIG. 3 is a plot of the temperature profile across the riser of the second FCCU.

The solids distribution across the cross section of the FCC riser of another major FCCU is shown in FIG. 2. This again was determined using a gamma-ray scan but at a point 1.5 m (5 ft) above the level of the feed injection. This diagram makes the point that the contacting is dependent upon both the catalyst flow pattern and feed injection. During operation, some feed nozzles might become plugged or partially plugged, resulting in uneven feed rate distribution to each feed nozzle. For radial feed injection, the feed nozzles cannot cover the full riser cross-section. There is always a "shadow region" with no oil coverage near the walls between adjacent nozzles and a hot solids core with small oil coverage existing at the center of the feed zone as shown by FIG. 2. The temperature traverse data taken across this large diameter riser in showed a temperature difference of about 65° C. (117° F.) between the core and the wall regions in region just above the feed zone (FIG. 3, temperatures measured 4.6 m (15 ft) above the level of the feed injection).

As described above, the feed injector rebalancing methodology comprises four steps:
1. The temperature responses of the temperature indicators (TIs) in the feed zone are monitored in a feed nozzle step test in which the feed to each injector nozzle is varied from fully closed to fully open while the temperature response of the feed zone TIs is determined.
2. A temperature response matrix model is developed from the data obtained in Step 1. The temperature response matrix model indicates the TI temperature change with one nozzle closed from the base case with all nozzles fully opened.
3. Third, the temperature response matrix model is used as a basis to develop a predictive model from an optimization algorithm to generate the temperature spread across the feed zone, $\Delta T=\max(TIs)-\min(TIs)$ as the feed rate to each feed injector is varied. In order to facilitate development of the predictive model, two linear assumptions are made:
    Assumption 1: TI responses are linear with nozzle closure;
    Assumption 2: Total temperature response is the addition of each nozzle's effect.
4. The feed zone performance is optimized according to the option selected from Step Three by adjusting the feed rate to each feed injector to the rate (including zero flow if necessary) to achieve the desired minimum temperature differential $\Delta T$ across the riser.

The predictive model is generated using the assumptions of linearity to minimize the feed zone temperature spread, $\Delta T=\max(TIs)-\min(TIs)$, by using the feed rate to each feed injector as the independent variables in an optimization algorithm. A number of commercially available optimization algorithms are available and models using spreadsheets are suitable. The use of spreadsheets for optimization is described in a number of sources such as *Optimization Modeling with Spreadsheets*, Second Edition, Baker K. R, ISBN: 978-0-470-92863-9; *The Art of Modeling with Spreadsheets: Management Science, Spreadsheet Engineering, and Modeling Craft*, Powell Stephen G., Baker Kenneth R., ISBN-13: 978-0471209379, *Optimization Modeling with Spreadsheets*, Baker K., ISBN-13: 978-0534494742. Among the spreadsheet optimization models is, Microsoft Excel Solver™ has been found suitable for the present optimization process. In the optimization, the optimization model the target cell will be the temperatures across the riser and the Objective will be to minimize the value of the temperature differentials between all the measurement points (TIs). The changing cells will be the flow rates of the feed injectors to which the maximum and minimum injector constraints may be added, e.g. from size limitations, steam rate, etc. Other optimization models such as LINGO™ (Undo Systems Inc, Chicago), OPTIMAX™ 2000 (Maximal Software Inc), can be used in a similar manner. If the valves for the feed injectors require manual adjustments the oil feed rate for each feed injector at which the temperature difference across the feed zone is minimized can be determined by optimization of the temperature response matrix model of the temperatures using a spreadsheet optimization. For operation in the manual control mode, the feed rate to the injectors may be varied based on the feed valve type, e.g. globe valves can be adjusted manually by changing the stem location and gate valves set at fully open or fully closed.

The optimization principle may be applied to real time optimization models in order to achieve automated control of this aspect of the FCC process. In fully automated operation, the measured temperatures in the riser are used as inputs for the optimization model which is linked to an automated control system for the injectors to effect the changes in injector flow rates required to achieve the optimal or desired degree of uniformity in the oil/catalyst mixing. When implementing fully automated control of the injectors, control valves may be adjusted to control the flow rate progressively by changing the stem location; with gate valves which are better operated either fully open or fully closed, the optimization model will preferably be selected to function and control the system according to that constraint.

In a fully automated mode, the oil feed rate for each feed injector is determined by real time optimization of the temperature response matrix model of the temperatures measured in Step a) using a real time optimization model utilizing the measured temperatures in the riser during operation as inputs for the optimization. Here, preferably the oil feed rate for each feed injector is controlled automatically in response to the real time optimization model. In an embodiment, the flow rate of the oil feed to the feed injectors is controlled real time by means of automated control valves. In the fully automated mode, it is preferred to have on-line real-time temperature measurements wherein the temperature profile can be determined and such temperature data points provide inputs to the temperature response matrix model. Preferably, this method utilizes data from at least four (4), more preferably at least eight (8), wall temperature indicators.

In a preferred embodiment utilizing the automation optimization oil/catalyst mixing herein, the data from the wall temperature indicators is input into a logic control device wherein the temperature response matrix model calculations are performed, then the logic control device sends a setpoint output to the automated control valves based on the optimization calculations from the temperature response matrix model. Most preferably, the logic control device is either a programmable logic controller (PLC) or a distributed control system (DCS). Programmable logic controller (PLC) are typically logic control devices that control only limited functions (e.g., just handling the temperature response matrix model calculations and output controls based on the input from the TIs), wherein a distributed control system (DCS) typically is a much larger and complex logic control device that handles multiple integrated controls for at least a major portion of a refinery operating unit. The automated temperature response matrix model and its associated inputs and outputs could be accommodated in either logic control device platform.

The optimization procedure may generally be expected to identify more than one optimum operating solution, especially if the constraints on the changing cells have not been specified in all respects. To avoid this ambiguity, the applicable operating constrains should desirably be entered into the optimization model with the objective of providing a unique solution or as few as feasible. When, however, multiple solutions are obtained, an appropriate option can be selected according to constraints in the refinery (e.g., feed header pressure, feed injector valve type) which have not been entered into the model. This can be further automated by imposing hierarchical constraints in the model (such as maximum atomizer flow, minimum atomizer valve pressure, maximum riser temperature, etc.) on determining the setting selections.

In the determination of the temperature profile, the temperatures are preferably measured by temperature indicators (TIs) at at least three (3) or more positions, more preferably at at least five (5) or more positions, across the riser during the nozzle step test; it will not normally be feasible to have TIs permanently located across the riser. Alternatively, wall temperature indicators (TIs), typically thermocouples extended permanently into about 10 cm (4 in) into the riser, may be used both for the step test and during normal operation. If wall temperature indicators are utilized, is preferred that at least four (4) or more, preferably at least eight (8) or more, wall TIs be utilized. These wall TIs should be located at the same elevation alone the circumference of the riser. Preferably, the wall TIs are equally spaced along the circumference of the riser. In this manner, a temperature profile in the reactor riser can be calculated from the temperature indications for use in the manual and/or automated optimization steps.

The temperature measurements are made at a level above the level of the injectors and in order to reduce the effect of the mixing between the catalyst and oil and cracking products which takes place as the mixture proceeds up the riser propelled by the incoming streams of oil, catalyst and steam and the expansion of the gaseous cracking products, the measurement should be made not more than 10 meters (m), preferably not more than 5 m (e.g. not more than 1.5 to 3 m), above the level of the feed injectors.

If multiple levels of injectors are used, e.g. with different feeds to optimize atomization for each feed, the temperature profile may be measured above each level if optimization at each level is to be achieved although measurement above the upper ring will enable the overall response to be determined and the temperature profile optimized as individual injector rates are varied n the nozzle step test. Adjustment of the feed rate to each feed injector can be achieved in the conventional manner by controlling the feed flow rate to the individual injectors although it may be desirable to use variable throat injectors as described in U.S. Pat. No. 5,173,175 and U.S. Pat. No. 5,298,155 to achieve optimal feed atomization when the feed rate is varied from nominal.

Additionally or alternatively the present invention can be described according to one or more of the following embodiments:

Embodiment 1

A method of improving the uniformity of the contacting of a heavy oil feed with an FCC cracking catalyst in a feed zone of an FCC cracking riser in which the heavy oil feed is injected into the riser by means of feed injectors located around the riser, wherein the heavy oil contacts the catalyst in the feed zone to create an oil/catalyst mixture, the method comprising:

a) Measuring the temperature profile of the oil/catalyst mixture in the feed/mixing zone of the FCC riser in a feed injector step test in which the oil feed rate to each feed injector is varied while the temperature profile information is recorded;

b) Developing a temperature response matrix model from the temperature profile information from Step a);

c) Determining from the temperature response matrix model the optimum feed rate for each injector at which the temperature difference across the feed zone is minimized; and d) Adjusting the oil feed rate into the feed zone through each of the individual feed injectors at a flow rate based on the determination from the temperature response matrix model.

Embodiment 2

The method according to embodiment 1, wherein at least a portion of the measurements taken in Step a) for the temperature response matrix model are taken with one feed injector closed while the other feed injectors are fully open, and repeating this measurement for each (i.e., closed) feed injector.

Embodiment 3

The method according to any prior embodiment, wherein the differences in the temperature profile in the oil/catalyst mixture across the feed zone are minimized in response to temperatures measured above the level of the feed injectors.

Embodiment 4

The method according to any prior embodiment, wherein the temperature profile of the oil/catalyst mixture in the feed zone of the FCC riser is measured at a level above, but not more than 10 meters above, the level of the feed injectors.

Embodiment 5

The method according to any prior embodiment, wherein the temperature profile of the oil/catalyst mixture in the feed zone of the FCC riser is measured at a level above, but not more than 5 meters above, the level of the feed injectors.

Embodiment 6

The method according to any prior embodiment, wherein the differences in the temperature profile in the oil/catalyst mixture across the feed zone are measured by the use of wall temperature indicators.

Embodiment 7

The method according to any prior embodiment, wherein the temperature profile is determined by using data from at least four wall temperature indicators.

Embodiment 8

The method according to any prior embodiment, wherein the adjusting of the oil feed rate in Step d) results in minimizing the differences in the temperature profile in the oil/catalyst mixture across the feed zone.

Embodiment 9

The method according to any prior embodiment, wherein the oil feed rate for each feed injector at which the temperature difference across the feed zone is minimized is determined by optimization of the temperature response matrix model of the temperatures measured in Step a) using a spreadsheet optimization.

Embodiment 10

The method according to any one of embodiments 1-8, wherein the oil feed rate for each feed injector is determined by real time optimization of the temperature response matrix model of the temperatures measured in Step a) using a real time optimization model utilizing the measured temperatures in the riser during operation as inputs for the optimization.

Embodiment 11

The method according to embodiment 10, wherein the oil feed rate for each feed injector is controlled automatically in response to the real time optimization model.

Embodiment 12

The method according to embodiment 11, wherein the flow rate of the oil feed to the feed injectors is controlled real time by means of automated control valves.

Embodiment 13

The method according to embodiment 12, wherein the data from Step a) is input into a logic control device wherein Steps b) and c) are performed, then the logic control device sends an setpoint output to the automated control valves based on the optimization calculations from the temperature response matrix model.

Embodiment 14

The method according to embodiment 13, wherein the logic control device is either a programmable logic controller (PLC) or a distributed control system (DCS).

EXAMPLES

Example 1

Figure 4:
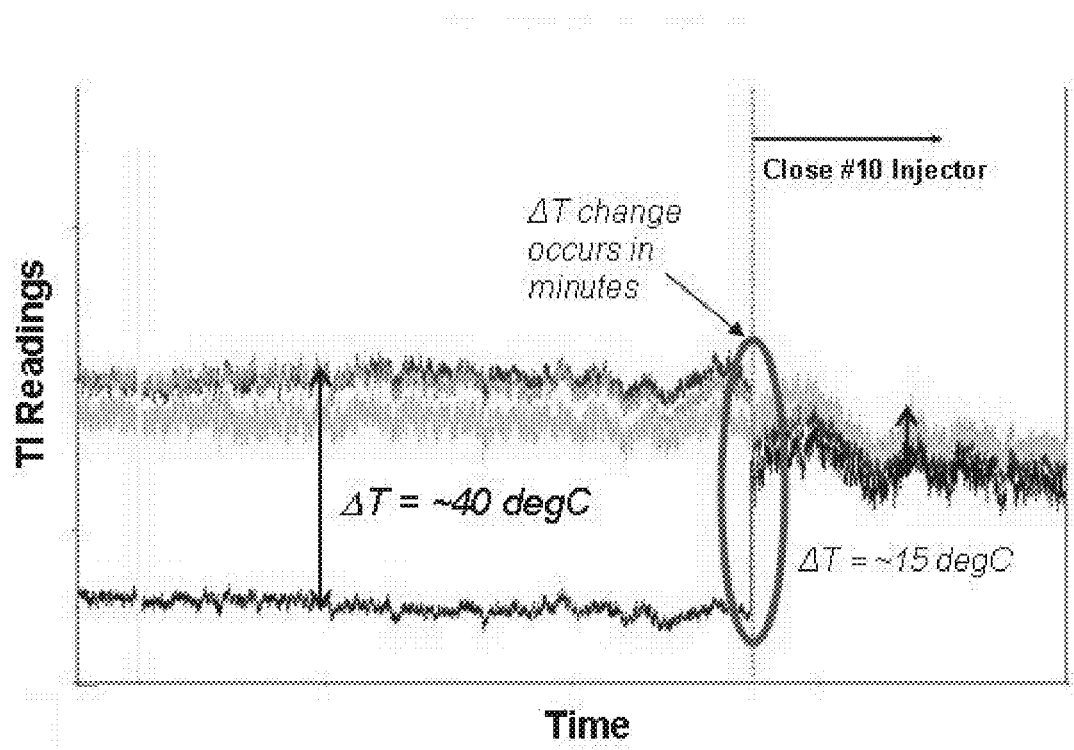
FIG. 4 is plot of the improvement in the temperature profile achieved at a third commercial FCCU by applying feed injector rebalancing methodology.

A major commercial FCCU experienced a wide spread of four feed zone TIs with a measured temperature difference over four feed zone TIs of about 40° C. The feed injector rebalancing methodology according to this invention indicated that closing one particular nozzle would reduce the feed zone temperature difference over the four TIs by about 50%. On closing the particular indicated nozzle, the temperature difference over the TI's was reduced rapidly from about 40° C. (72° F.) to about 15° C. (27° F.) as shown in FIG. 4. Consequently, the butadiene make, which primarily results from thermal cracking, was reduced by about 20%.

Example 2

Figure 5:
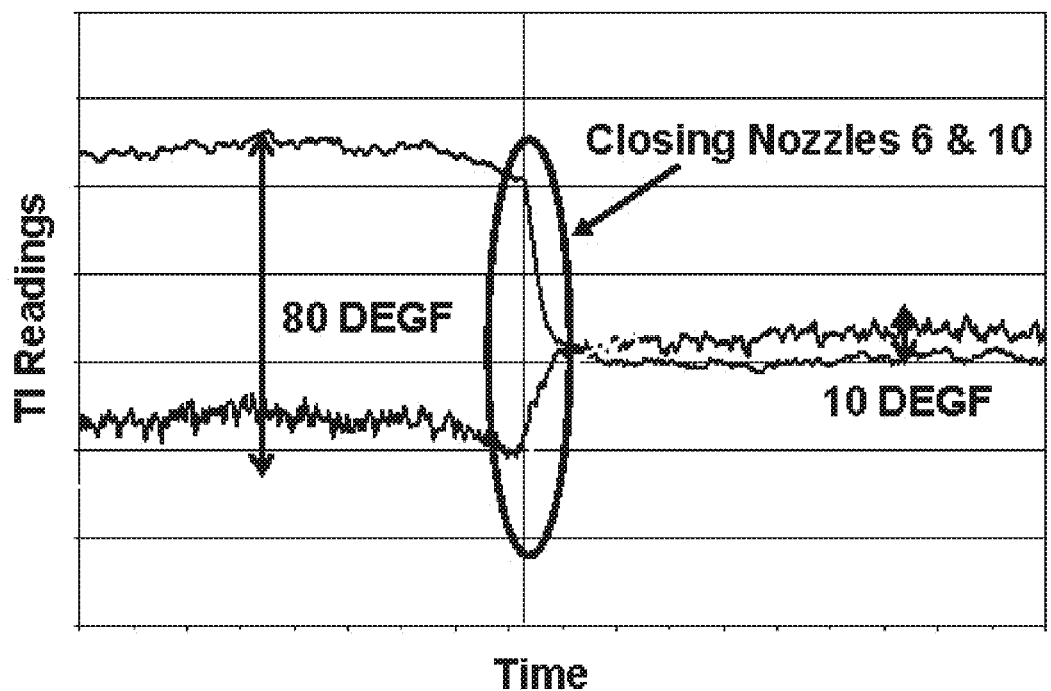
FIG. 5 is plot of the improvement in the temperature profile achieved at the first commercial FCCU (of FIG. 1 above) by applying the feed injector rebalancing methodology.

A major FCCU has three feed zone TIs with a temperature difference of about 44° C. (80° F.). By applying the feed injector rebalancing methodology according to this invention, the results of the method indicated that closing two particular nozzles would reduce the feed zone temperature difference 11° C. (20° F.). These two were closed and the temperature difference over the three TIs was reduced rapidly from about 44° C. (80° F.) to about 6° C. (10° F.), as shown by FIG. 5. Consequently, the dry gas make, which primarily results from thermal cracking, was reduced by about 5%.

Example 3

A major commercial FCCU historically used a trial and error approach to adjust the feed rate to each of ten feed nozzles. This approach required significant effort to adjust the ten nozzles depending on the experience of the operators. By applying the feed injector rebalancing methodology to optimize feed zone performance, the temperature difference over four feed zone TIs was further reduced by 20% over typical values. The comparison of the feed nozzle opening obtained by the trial and error method and the feed injector rebalancing methodology is shown in Table 1; the adjustments in the flow rates to the injectors were made by varying the position of the injector stem and the results are reported as stem positions. The results show the feed injector rebalancing methodology optimizes the feed zone performance while significantly reducing effort required tuning the feed injectors (effort to adjust the feed nozzles was reduced from about 1 hour to about 10 minutes).

TABLE 1

FCCU Feed Zone Performance by applying feed injector rebalancing methodology

| Nozzle | Original Feed Injector Stem Position by Trial and Error Length from origin, cm | Feed Injector Stem Position by Feed Injector Rebalancing Methodology Length from origin, cm |
|---|---|---|
| A | 2.05 | 2.06 |
| B | 2.10 | 2.16 |
| C | 2.03 | 2.08 |
| D | 2.37 | 2.02 |
| E | 2.49 | 2.39 |
| F | 2.56 | 2.25 |
| G | 2.11 | 2.08 |
| H | 2.25 | 2.39 |
| I | 2.43 | 2.63 |
| J | 2.20 | 2.30 |
| ΔT | 13° C. | 10° C. |

What is claimed is:

1. A method of improving the uniformity of the contacting of a heavy oil feed with an FCC cracking catalyst in a feed zone of an FCC cracking riser in which the heavy oil feed is injected into the riser by means of feed injectors located around the riser, wherein the heavy oil contacts the catalyst in the feed zone to create an oil/catalyst mixture, the method comprising:

a) Measuring the temperature profile of the oil/catalyst mixture in the feed/mixing zone of the FCC riser in a feed injector step test in which the oil feed rate to each feed injector is varied while the temperature profile information is recorded;
b) Developing a temperature response matrix model from the temperature profile information from Step a), wherein the temperature response matrix model indicates a temperature change with one injector closed from a base case with all injectors fully open;
c) Determining from the temperature response matrix model the optimum feed rate for each injector at which the temperature difference across the feed zone is minimized by using the temperature response matrix model to develop a predictive model from an optimization algorithm; and
d) Adjusting the oil feed rate into the feed zone through each of the individual feed injectors at a flow rate based on the determination from the temperature response matrix model.

2. The method according to claim 1, wherein at least a portion of the measurements taken in Step a) for the temperature response matrix model are taken with one feed injector closed while the other feed injectors are fully open, and repeating this measurement for each (i.e., closed) feed injector.

3. The method according to claim 1, wherein the differences in the temperature profile in the oil/catalyst mixture across the feed zone are minimized in response to temperatures measured above the level of the feed injectors.

4. The method according to claim 1, wherein the temperature profile of the oil/catalyst mixture in the feed zone of the FCC riser is measured at a level above, but not more than 10 meters above, the level of the feed injectors.

5. The method according to claim 4, wherein the temperature profile of the oil/catalyst mixture in the feed zone of the FCC riser is measured at a level above, but not more than 5 meters above, the level of the feed injectors.

6. The method according to claim 5, wherein the differences in the temperature profile in the oil/catalyst mixture across the feed zone are measured by the use of wall temperature indicators.

7. The method according to claim 6, wherein the temperature profile is determined by using data from at least four wall temperature indicators.

8. The method according to claim 1, wherein the adjusting of the oil feed rate in Step d) results in minimizing the differences in the temperature profile in the oil/catalyst mixture across the feed zone.

9. The method according to claim 1, wherein the oil feed rate for each feed injector at which the temperature difference across the feed zone is minimized is determined by optimization of the temperature response matrix model of the temperatures measured in Step a) using a spreadsheet optimization.

10. The method according to claim 1, wherein the oil feed rate for each feed injector is determined by real time optimization of the temperature response matrix model of the temperatures measured in Step a) using a real time optimization model utilizing the measured temperatures in the riser during operation as inputs for the optimization.

11. The method according to claim 10, wherein the oil feed rate for each feed injector is controlled automatically in response to the real time optimization model.

12. The method according to claim 11, wherein the flow rate of the oil teed to the feed injectors is controlled real time by means of automated control valves.

13. The method according to claim 12, wherein the temperature profile in Step a) is determined by using data from at least four wall temperature indicators.

14. The method according to claim 13, wherein the data from Step a) is input into a logic control device wherein Steps b) and c) are performed, then the logic control device sends an setpoint output to the automated control valves based on the optimization calculations from the temperature response matrix model.

15. The method according to claim 14, wherein the logic control device is either a programmable logic controller (PLC) or a distributed control system (DCS).

* * * * *